US006948770B1

(12) United States Patent
Lee

(10) Patent No.: US 6,948,770 B1
(45) Date of Patent: Sep. 27, 2005

(54) SUPPORTING FRAME FOR MOUNTING A SEAT DEVICE ON A BICYCLE SEAT POST

(76) Inventor: Daniel Lee, No. 323, Chung-Hua Rd., Nantou City (TW)

( * ) Notice: Subject to any disclaimer, the term of this patent is extended or adjusted under 35 U.S.C. 154(b) by 0 days.

(21) Appl. No.: 11/101,562

(22) Filed: Apr. 8, 2005

(51) Int. Cl.[7] .................................................. B60N 2/38
(52) U.S. Cl. .................................................. 297/195.1
(58) Field of Search ........................ 297/195.1, 215.15, 297/DIG. 2; 403/84, 87; 248/219.2; 280/281.1, 280/288.4

(56) References Cited

U.S. PATENT DOCUMENTS 4,440,440 A * 4/1984 Juy ....................... 297/215.14
5,456,481 A * 10/1995 Allsop et al. ............ 280/281.1
5,722,718 A * 3/1998 Still et al. .............. 297/215.15
5,791,673 A * 8/1998 Patterson ................. 280/281.1
5,979,978 A * 11/1999 Olsen et al. ........... 297/215.15
6,213,488 B1 * 4/2001 Filice et al. ............. 280/281.1
6,666,507 B1 * 12/2003 Ringgard ................. 297/195.1
2005/0040683 A1 * 2/2005 Bugle et al. ............. 297/195.1

* cited by examiner

*Primary Examiner*—Milton Nelson, Jr.
(74) *Attorney, Agent, or Firm*—Greenblum & Bernstein, P.L.C.

(57) ABSTRACT

A supporting frame for mounting a seat device on a bicycle seat post includes a frame body and a connecting piece. The frame body is made of a fiber-reinforced plastic material, and has a stem portion, and two support arms branching from the stem portion. The connecting piece is made of metal, and is connected between the support arms. The connecting piece includes two wing plates insert-molded with the support arms, and a through hole formed between the wing plates.

5 Claims, 5 Drawing Sheets

SUPPORTING FRAME FOR MOUNTING A SEAT DEVICE ON A BICYCLE SEAT POST

BACKGROUND OF THE INVENTION

1. Field of the Invention

The invention relates to a supporting frame, more particularly to a supporting frame for mounting a seat device on a bicycle seat post.

2. Description of the Related Art

Referring to FIG. 1, a conventional seat assembly 1 for a bicycle includes a seat device 11, a supporting frame 12, a seat post 13, and a clamp unit 14. The supporting frame 12 is connected to a bottom face 111 of the seat device 11 through a three-point supporting method, and includes two supporting arms 121. The seat post 13 has a seat-mounting member 131 formed on a top end thereof. The clamp unit 14 includes a lower clamping member 141, and an upper clamping member 142. The lower clamping member 141 is superimposed on the seat-mounting member 131, and cooperates with the upper clamping member 142 to clamp therebetween the supporting arms 121 of the supporting frame 12. A threaded bolt 143 is passed through the seat-mounting member 131 and the lower and upper clamping members 141, 142, and engages an engaging piece 144 so that the supporting frame 12 is clamped securely between the upper and lower clamping members 142, 141.

Although the aforementioned conventional seat assembly 1 can achieve its intended purpose, it has the following drawbacks:

1. The supporting frame 12 is connected to the seat post 13 through the upper and lower clamping members 142, 141. This configuration as such results in the conventional seat assembly 1 having many components so that assembly of the same is complicated.

2. The upper and lower clamping members 142, 141 cannot stably clamp the supporting frame 12 because of gaps that are formed between the upper and lower clamping members 142, 141 when the clamping members 142, 141 are coupled. This results in unsteady support of the seat device 11.

SUMMARY OF THE INVENTION

Therefore, the object of the present invention is to provide a supporting frame that has simplified components and that can stably mount a seat device on a bicycle seat post.

According to this invention, a supporting frame for mounting a seat device on a bicycle seat post comprises a frame body and a connecting piece. The frame body is made of a fiber-reinforced plastic material, and has a stem portion, and two support arms branching from the stem portion. The connecting piece is made of metal, and is connected between the support arms. The connecting piece includes two wing plates insert-molded with the support arms, and a through hole formed between the wing plates.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
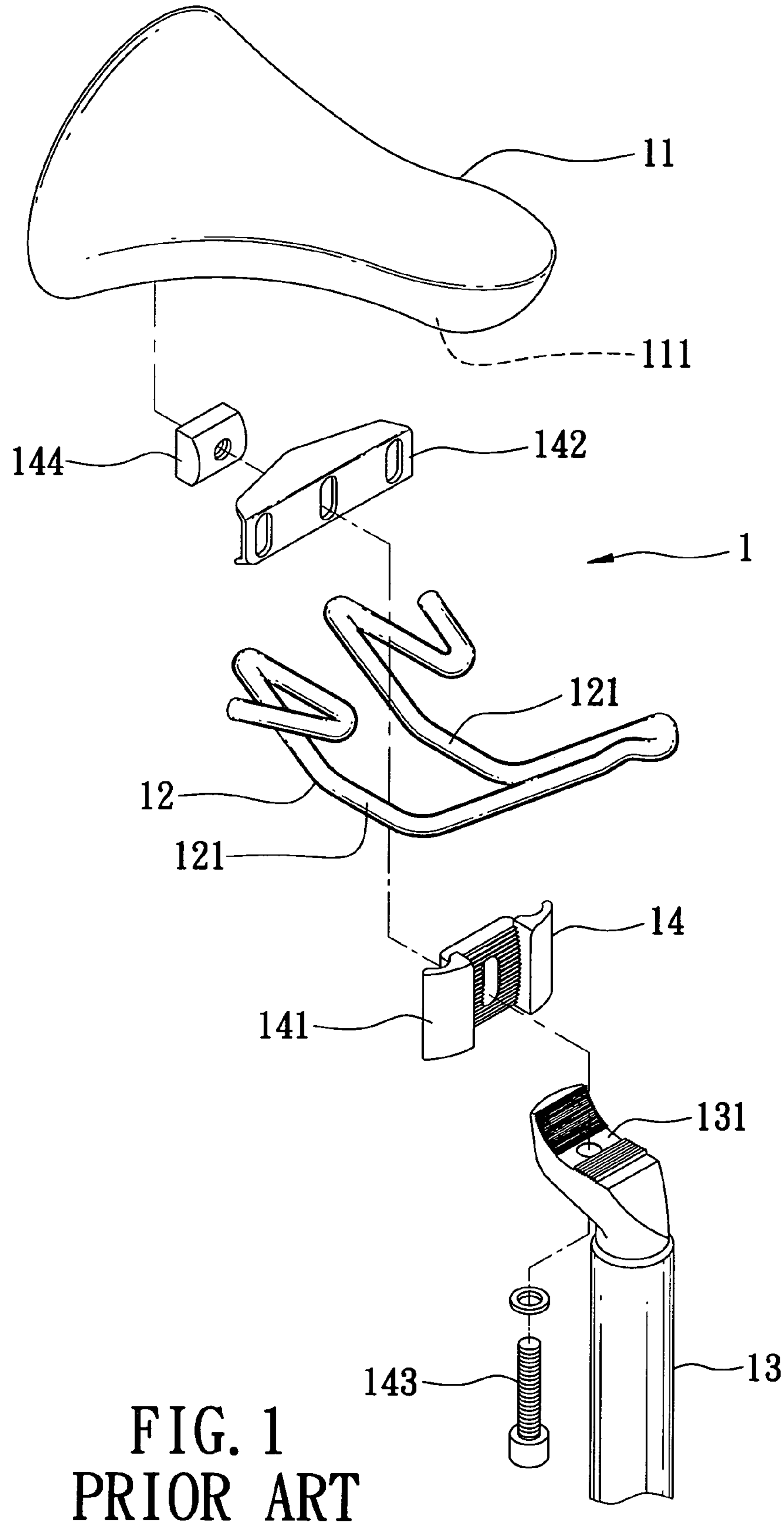
FIG. 1 is an exploded perspective view of a conventional seat assembly for a bicycle.
Figure 2:
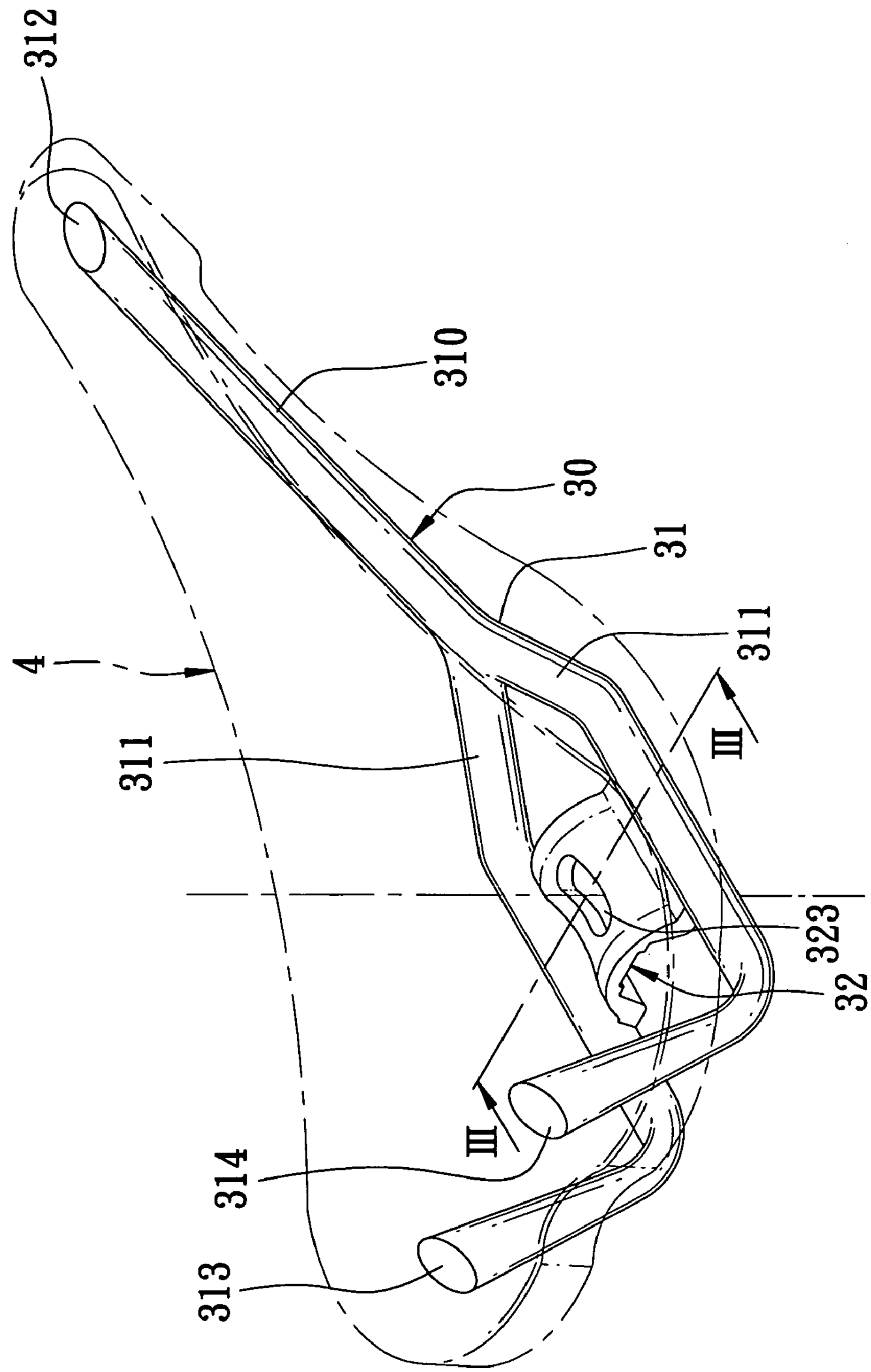
FIG. 2 is a perspective view of the preferred embodiment of a supporting frame according to the present invention.
Figure 3:
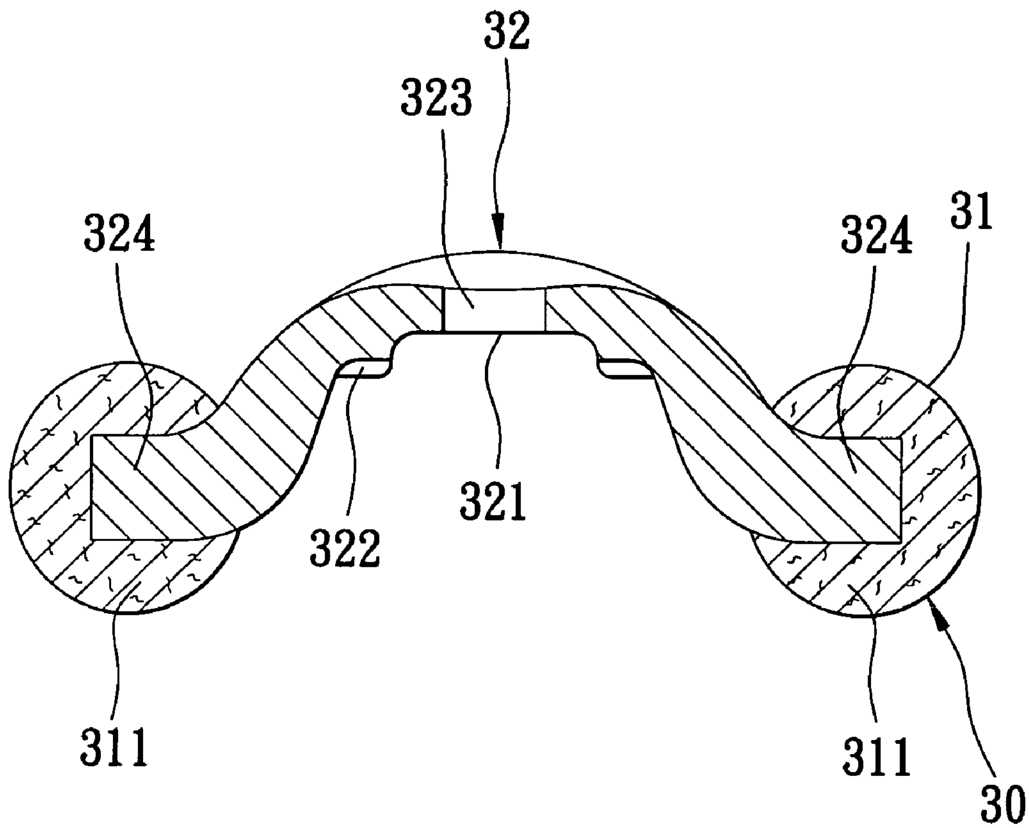
FIG. 3 is a sectional view of the preferred embodiment taken along line III—III of FIG. 2.
Figure 4:
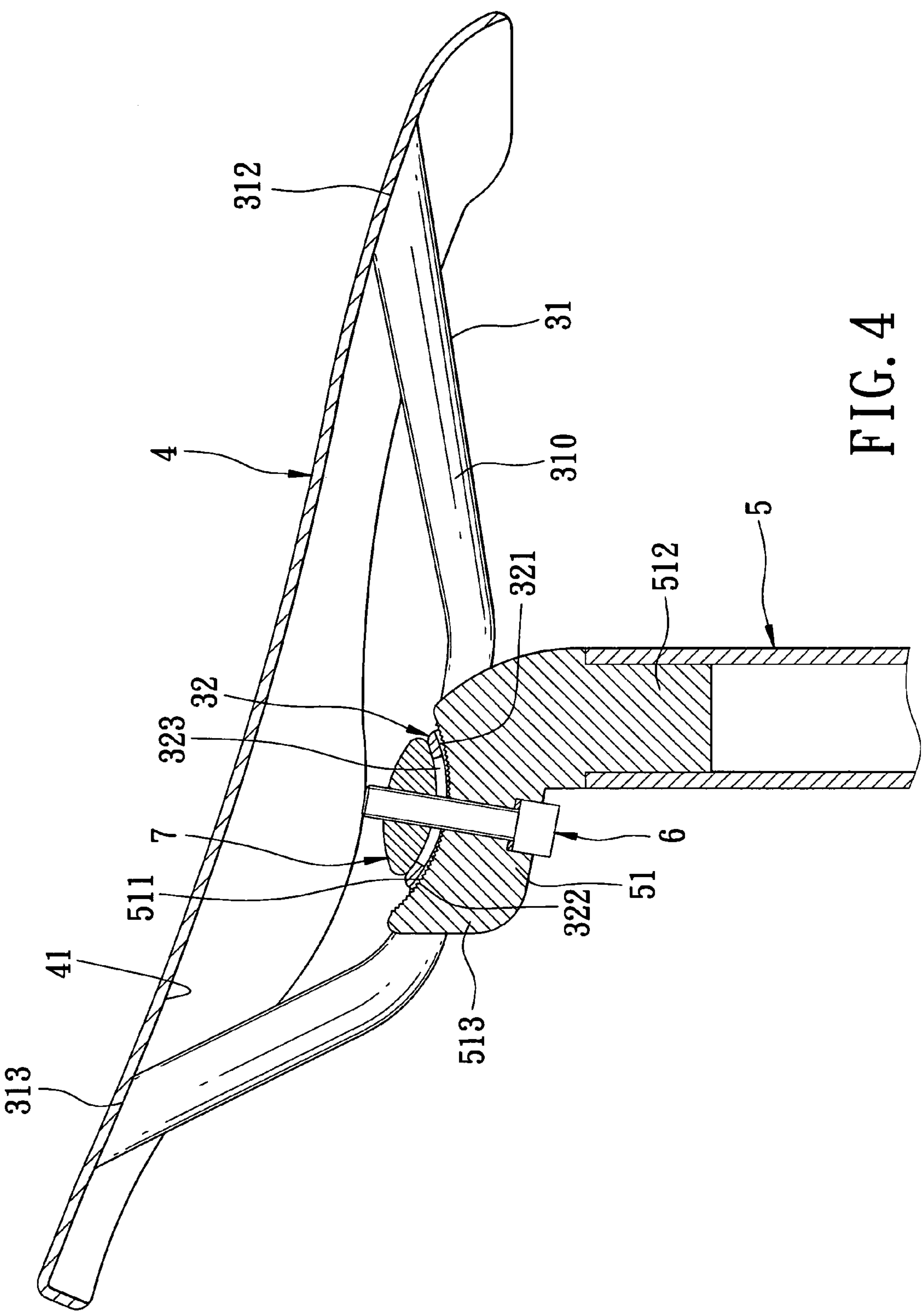
FIG. 4 is a fragmentary sectional view, illustrating the preferred embodiment in a state of use.

Referring to FIGS. 2 to 4, the preferred embodiment of a supporting frame 30 according to the present invention is adapted to mount a seat device 4 on a bicycle seat post 5, and is shown to comprise a frame body 31, a connecting piece 32, and a seat-mounting member 51.

The frame body 31 is made of a fiber-reinforced plastic material, which includes a reinforcing material. The reinforcing material is selected from the group consisting of carbon fiber, glass fiber, a combination of nylon and carbon fibers, and a combination of nylon and glass fibers. The frame body 31 is substantially Y-shaped, as best shown in FIG. 2, and has a stem portion 310, two support arms 311 branching from the stem portion 310, and three supporting points 312, 313, 314 connected to a bottom surface 41 of the seat device 4.

The connecting piece 32 is made of an aluminum alloy, and is connected between the support arms 311. The connecting piece 32 includes two wing plates 324 insert-molded with the support arms 311, and an elongated through hole 323 formed between the wing plates 324. The connecting piece 32 has a bottom surface 321 formed with a plurality of ridges 322.

The seat-mounting member 51 has a lower portion 512 adapted to be connected to the bicycle seat post 5, and an upper portion 513 to support the connecting piece 32. The upper portion 513 has a top surface formed with a plurality of ridges 511. The ridges 511 are in frictional contact with the ridges 322 of the connecting piece 32 when the connecting piece 32 is superimposed on the upper portion 513 so that movement of the connecting piece 32 relative to the seat-mounting member 51 along a transverse direction is restricted.

A threaded bolt 6 is passed through the seat-mounting member 51 and the through hole 323 in the connecting piece 32, and engages an engaging piece 7 so as to secure the connecting piece 32 to the seat-mounting member 51. The seat device 4 is thus connected to the bicycle seat post 5 through the connecting piece 32 and the seat-mounting member 51 of the supporting frame 30. Furthermore, the connecting piece 32 can move relative to the seat-mounting member 51 along a longitudinal direction through the through hole 323 so as to adjust inclining angles of the seat device 4 and the supporting frame 30 relative to the bicycle seat post 5.

Figure 5:
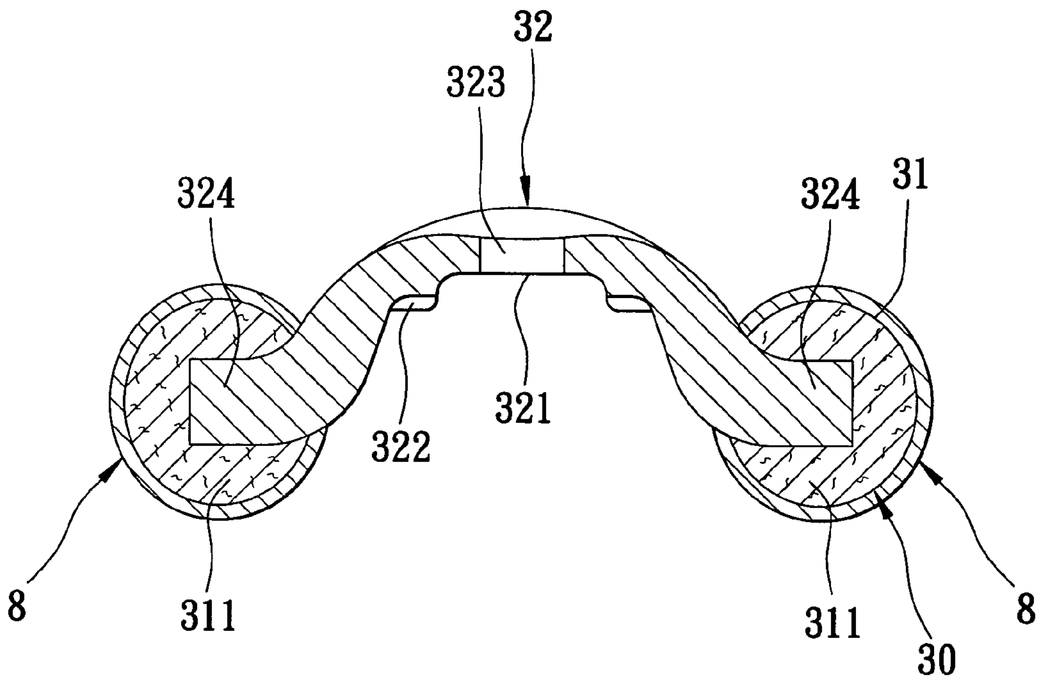
FIG. 5 is a view similar to FIG. 3, but illustrating the preferred embodiment with C-shaped clamp members.

Referring to FIG. 5, the supporting frame 30 of the present invention further comprises two clamp members 8 sleeved respectively on portions of the support arms 311 of the frame body 31 proximate to the wing plates 324 of the connecting piece 32. Each of the clamp members 8 has a substantially C-shaped cross section, and clamps a respective one of the wing plates 324 to further enhance connection between the frame body 31 and the connecting piece 32.

The process of making the supporting frame 30 of the present invention includes the following steps:

1. Preparing a plurality of resin-impregnated sheets, and the connecting piece 32. The resin-impregnated sheets are made by stacking a plurality of fiber sheets. The fiber sheets are pre-soaked in a resin. The fiber sheets include a material which is selected from the group consisting of carbon fiber, glass fiber, a combination of nylon and carbon fibers, and a combination of nylon and glass fibers.

2. Pre-forming the resin-impregnated sheets into an elongated body having a C-shaped cross section.
3. Placing the elongated body and the connecting piece 32 into a mold. The wing plates 324 of the connecting piece 32 are inserted into the elongated body.
4. Heating the mold and forming the supporting frame 30. The mold is heated to a temperature between 60° and 90° C., and is then pressed so that the elongated body forms the substantially Y-shaped frame body 31 integrated with the connecting piece 32. The connecting piece 32 is fixed between the two support arms 311 of the frame body 31.

From the aforementioned description, it is apparent that the frame body 31 and the connecting piece 32 are formed integrally so as to simplify both the overall structure of the supporting frame 30 and the installation of the seat device 4 on the bicycle seat post 5. Furthermore, since the frame body 31 and the connecting piece 32 are formed integrally, gap problems, such as those in the conventional seat assembly 1, can be avoided, so that the seat device 4 is stably mounted on the bicycle seat post 5.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A supporting frame for mounting a seat device on a bicycle seat post, comprising:

a frame body made of a fiber-reinforced plastic material and having a stem portion, and two support arms branching from said stem portion; and a connecting piece made of metal and connected between said support arms, said connecting piece including two wing plates insert-molded with said support arms, and a through hole formed between said wing plates.

2. The supporting frame as claimed in claim 1, wherein said connecting piece has a bottom surface formed with a plurality of ridges.

3. The supporting frame as claimed in claim 2, further comprising a seat-mounting member having a lower portion adapted to be connected to the seat post, and an upper portion to support said connecting piece, said upper portion having a top surface formed with a plurality of ridges.

4. The supporting frame as claimed in claim 1, further comprising two clamp members sleeved respectively on portions of said support arms proximate to said wing plates, each of said clamp members having a substantially C-shaped cross section, and clamping a respective one of said wing plates.

5. The supporting frame as claimed in claim 1, wherein said fiber-reinforced plastic material includes a reinforcing material which is selected from the group consisting of carbon fiber, glass fiber, a combination of nylon and carbon fibers, and a combination of nylon and glass fibers.

* * * * *